Patented Dec. 30, 1947

2,433,633

UNITED STATES PATENT OFFICE 2,433,633

TWO-STAGE AMINE FLOTATION OF GLASS SANDS

Edwin B. Stokes, Lakeland, Fla., assignor to Minerals Separation North American Corporation, New York, N. Y., a corporation of Maryland No Drawing. Application May 1, 1945, Serial No. 591,427

2 Claims. (Cl. 209—166)

The present invention relates to processes of purifying industrial sands, and particularly glass sands, by froth-flotation.

Such sands generally contain ferruginous impurities in the form of iron-bearing and iron-stained minerals, which are detrimental in glass making. Although such ferruginous impurities may exist in the sands in extremely small quantities, it is essential that they be reduced to very low limits. That, however, presents difficulties probably owing to the fact that the ferruginous impurities exist as different minerals having different chemical compositions and different physical properties and, therefore, do not all respond in the same way to a particular froth-flotation reagent.

The present invention is the result of my discovery that, after glass sands have been subjected to froth-flotation treatment in the presence of a cationic active amine compound which is a collector for quartz, the quartz froth-float so obtained can be further purified by subjecting it to froth-flotation treatment after conditioning it in an aqueous pulp merely with a small amount of a mineral acid (with or without a frothing agent) which produces a ferruginous froth-float which is discarded, leaving the residue as the purified glass sands. This discovery was surprising, since the conditioning of glass sands merely with a mineral acid (with or without a frothing agent) without such prior treatment of the sands, does not result in the production of a ferruginous froth-float when such sands are subjected to froth-flotation treatment. Evidently, the first treatment of the sands with a cationic active compound which is a collector for quartz so affects the sands in the quartz froth-float resulting from that first treatment, that a considerable proportion of the impurities in those sands are rendered froth-floatable by the addition of a mineral acid to an aqueous pulp of that quartz froth-float.

Therefore, my invention may be regarded as a process for reducing the amount of ferruginous impurities in glass sands, characterized by the successive steps of subjecting the sands to froth-flotation treatment in an aqueous pulp in the presence of a cationic active amine compound which is a collector for the quartz and removing the partially purified quartz froth-float product, and then conditioning the said quartz froth-float product in an aqueous pulp with a mineral acid and subjecting the thus conditioned pulp to froth-flotation treatment followed by removal and discarding of the ferruginous froth produced, leaving the residue as the purified glass sands.

I have also found that it is often advantageous to subject the sands to be purified to a preliminary froth-flotation treatment or treatments in the presence of an anionic active fatty-acid compound which is a collector for the ferruginous impurities, which preliminary treatment results in the removal and discarding of a froth-float containing some of the ferruginous impurities; and then the residue from said preliminary treatment or treatments is subjected to the cooperating froth-flotation treatments above described. Furthermore, such preliminary treatment not only effects partial removal of ferruginous impurities from the glass sands, but also leaves the sands in a condition in which they are more amenable to further purification by froth-flotation treatment in the presence of a cationic active amine compound to produce a quartz froth-float product, followed by froth-flotation treatment of that quartz-product with a mineral acid, in the manner above described. Therefore, I consider that my discoveries may be embodied in such a three-step treatment as well as in the two-step treatment above mentioned.

Cationic active amine compounds which are collectors for quartz are well known in the art of froth-flotation. A typical one is a commercial product understood to consist of approximately 73% mono-octadecylamine acetate, about 24% mono-heptadecylamine acetate, together with small quantities of secondary and tertiary amine acetates hereinafter referred to for convenience merely as octadecylamine acetate. Anionic fatty-acid compounds which are collectors for ferruginous impurities in glass sands are also well known in the art of froth-flotation; a typical one being tall oil which is a by-product from sulfate wood-pulp digestion, consisting mainly of resin acids and fatty acids. Typical of the mineral acids which may be employed in my process are sulfuric acid, nitric acid, hydrochloric acid, etc. Pine oil is a suitable frothing agent when one is used in the practice of my invention.

Example 1

In this example, the process embodying my invention was successfully applied to glass sands in which the particle sizes were minus-20-mesh. Those sands were acid-treated, deslimed and subjected to a caustic wash, and contained approximately 0.042% $Fe_2O_3$.

These sands were conditioned, for about two minutes in an aqueous pulp containing about 70% solids, with 1.0 lb. NaOH, 0.4 lb. of the octadecylamine acetate hereinbefore described and 0.1 lb. pine oil, and subjected to froth-flotation treatment to produce a quartz froth-float containing less ferruginous impurities than the original feed. This quartz froth-product was then conditioned, for about 15 seconds in an aqueous pulp containing about 10% solids, with 1.6 lbs. sulfuric acid and 0.2 lb. pine oil, each per ton of solids in the pulp; and this conditioned pulp was subjected to froth-flotation treatment, with the result that a considerable proportion of the ferruginous impurities therein were froth-floated and discarded, leaving the residue as the purified glass sands. These purified glass sands contained only approximately 0.028% $Fe_2O_3$, and the weight recovery was 84.1%.

Example 2

In this example of the successful practice of my invention, the glass sands to be purified contained all particle sizes minus 35-mesh, had not been acid-treated or deslimed or subjected to a caustic wash. These sands contained approximately 0.120% $Fe_2O_3$.

These sands were preliminarily partially purified by subjecting them to two froth-flotation treatments in the presence of an anionic fatty acid compound, which resulted in the removal and discarding of two ferruginous froth-floats. In the first of these froth-flotation treatments, an aqueous pulp of the sands containing about 70% solids was conditioned with 0.7 lb. tall oil and 0.14 lb. pine oil, per ton of solids; and in the second treatment the aqueous pulp which was the residue of the first treatment containing about 70% solids was conditioned for about 5 minutes with 0.4 lb. tall oil and 0.07 lb. pine oil, per ton of solids. These pulps were diluted and subjected to froth-flotation treatment, and the resulting ferruginous froth-floats were removed and discarded.

The residue of these preliminary treatments of the glass sands was then conditioned, for about 15 seconds at about 10% solids, with 0.4 lb. of the octadecylamine acetate hereinbefore described; and this conditioned pulp was subjected to froth-flotation treatment which resulted in a quartz froth-product containing less ferruginous impurities than the feed to that operation. This quartz float was returned to the machine and floated once, dropping out an iron bearing middling. Then this cleaned quartz froth-product was made into an aqueous pulp at about 10% solids and was conditioned for about 15 seconds with 4.1 lbs. sulfuric acid, followed by froth-flotation treatment which resulted in floating off ferruginous impurities leaving the residue as the purified glass sands. These purified glass sands contained only 0.037% $Fe_2O_3$, and the weight recovery was 74.4% of the original feed.

Example 3

In this example, my invention was successfully applied to glass sands which contained particle sizes minus-20-mesh. These sands were acid-treated, but were not further deslimed. They contained approximately 0.045% $Fe_2O_3$.

These sands were preliminarily partially purified (as in Example 2) by subjecting them to two froth-flotation treatments in the presence of an anionic fatty acid compound, which resulted in the removal and discarding of two ferruginous froth-floats. In each of these froth-flotation treatments, an aqueous pulp of the sands containing about 70% solids was conditioned for about two minutes, the agents for the first treatment being 0.5 lb. NaOH, 2.7 lbs. tall oil and 0.3 lb. pine oil, and in the second treatment being 0.5 lb. NaOH, 2.7 lbs. tall oil and 0.2 lb. pine oil, per ton of solids. These pulps were diluted and subjected to froth-flotation treatment, and the resulting ferruginous froth-floats were removed and discarded.

The residue of these preliminary treatments of the glass sands was then conditioned in an aqueous pulp containing about 10% solids for about 15 seconds with 0.6 lb. of the octadecylamine acetate hereinbefore described; and this conditioned pulp was subjected to froth-flotation treatment which resulted in a quartz froth-product containing less impurities than the feed to that operation. Then this froth-product was made into an aqueous pulp at about 70% solids and was conditioned for about one minute with 3.6 lbs. sulfuric acid and 0.2 lb. pine oil, per ton of solids; after which the thus conditioned pulp was subjected to froth-flotation treatment which resulted in floating off ferruginous impurities, leaving the residue as the purified glass sands. These purified glass sands contained only 0.034% $Fe_2O_3$, and the weight recovery was 86.8%.

What is claimed is:

1. A process for the treatment of glass sands to reduce the amount of ferruginous impurities therein, including the successive steps of removing a partially purified quartz froth-float product by froth-flotation methods utilizing a cationic active amine collector; then conditioning the said quartz froth-float product in an aqueous pulp with a mineral acid; and subjecting the thus conditioned pulp to froth-flotation treatment in the absence of any added collector thereby producing a ferruginous froth-float which is discarded, leaving the residue as purified glass sands.

2. A process for the treatment of glass sands to reduce the amount of ferruginous impurities therein including the successive steps of removing a ferruginous froth-float by froth-flotation methods utilizing an anionic active fatty-acid collector and discarding the ferruginous froth-float; then removing from the residue of the first step a partially purified quartz froth-float product by froth-flotation methods utilizing a cationic active amine collector; then conditioning the said quartz froth-float product in an aqueous pulp with a mineral acid; and subjecting the thus conditioned pulp to froth-flotation treatment in the absence of any added collector, thereby producing a ferruginous froth-float which is discarded, leaving the residue as the purified glass sands.

EDWIN B. STOKES.

REFERENCES CITED

The following references are of record in the file of this patent:

UNITED STATES PATENTS

| Number | Name | Date |
|---|---|---|
| 2,205,503 | Trottier | June 25, 1940 |
| 2,340,580 | Cole | Feb. 1, 1944 |
| 2,173,909 | Kritchevsky | Sept. 26, 1939 |